United States Patent [19]
Shpigel

[11] Patent Number: 5,314,425
[45] Date of Patent: May 24, 1994

[54] INTERLOCKING-BODY CONNECTIVE JOINT

[75] Inventor: Vladimir Shpigel, Brooklyn, N.Y.
[73] Assignee: Amrus Corporation, New York, N.Y.
[21] Appl. No.: 853,675
[22] Filed: Mar. 19, 1992

Related U.S. Application Data

[63] Continuation-in-part of Ser. No. 492,622, Mar. 13, 1990, Pat. No. 5,101,681.
[51] Int. Cl.$^5$ .................. A61B 17/56; G05G 11/00; F16D 3/00; B25J 17/00
[52] U.S. Cl. ...................... 606/53; 74/479; 403/57; 403/58; 901/23; 901/28
[58] Field of Search .................. 606/53–59; 74/479; 174/69; 403/24, 57, 58, 410; 901/23, 24, 28, 29

[56] References Cited

U.S. PATENT DOCUMENTS

3,759,003  9/1973  Wilson .................. 52/200.1
4,776,140 10/1988  Wight .................... 52/125.5
5,101,681  4/1992  Shpigel .................. 403/57

Primary Examiner—Michael A. Brown
Attorney, Agent, or Firm—Sprung Horn Kramer & Woods

[57] ABSTRACT

A connective joint comprises the following seven elements:
(a) Four quarter spheres arranged in adjacent quadrant relationship to form a substantially spherical element or "ball". The quarter spheres are provided with grooved edges that form two substantially perpendicular grooves extending around the spherical element;
(b) Two hinge elements, each having a ring shaped portion that is inserted in an individual one of the two grooves;
(c) A device for applying a force between two diametrically opposing ones of the quarter spheres in the spherical element.

29 Claims, 11 Drawing Sheets

FIG.22

INTERLOCKING-BODY CONNECTIVE JOINT

CROSS-REFERENCE TO RELATED APPLICATION

This application is continuation-in-part of my co-pending U.S. patent application Ser. No. 07/492,622, filed Mar. 13, 1990, and now U.S. Pat. No. 5,101,681. The entire contents of this prior application is incorporated herein by reference.

BACKGROUND OF THE INVENTION

The present invention relates generally to a connective mechanical joint; and more particularly to a joint that permits relative positioning of interconnected articles, such as a tripod and a camera, through large angles, and about an axis having virtually any arbitrarily selectable orientation.

My U.S. patent application Ser. No. 07/492,622, filed Mar. 13, 1990 (and now allowed) discloses a connective joint for interconnecting two articles, such as a tripod and a camera, comprised of two interlocking bodies, such as hollow rings, that are mounted on a common internal structure that permits each body to rotate about its own axis. The resulting joint can rotate in all directions with a very high angular range, in most cases limited only by the angles subtended by connecting stems used to mount the joint to the aforementioned articles. The joint may include a hollow central enclosure for passing flexible wires or tubing so that the wire or tubing can be passed through the joint without inhibiting the joint's high degree of freedom.

The internal structure of the joint, which is disclosed in this application, provides two interfitted "tracks" for the interlocking bodies or rings. This internal structure takes the form of four substantially identical interfitted elements or two substantially identical circular-segment corner pairs, each with offset centers.

SUMMARY OF THE INVENTION

It is an object of the present invention to provide an improved connective joint of the type disclosed in the aforementioned patent application Ser. No. 07/492,622.

It is a particular object of the present invention to provide a connective joint that is comprised of a minimum number of parts which are easily manufactured and assembled.

It is another particular object of the present invention to provide a connective joint which is extremely robust in operation.

It is another particular object of the present invention to provide a connective joint having two interlocking bodies which may be locked against motion relative to each other by a simple and robust mechanism.

These objects, as well as other objects which will become apparent from the discussion that follows, are achieved, in accordance with the present invention, by providing a connective joint which comprises the following seven elements:

(a) four quarter elements arranged in adjacent quadrant relationship;

(b) two hinge elements, each having a ring shaped portion engaged with the quarter elements; and (c) a device for applying a force to two diametrically opposing ones of the quarter elements.

In an advantageous embodiment of the present invention, the four quarter elements are constructed as quarter spheres to form a substantially spherical element or "ball" when the quarter elements are arranged in adjacent quadrant relationship.

In order to facilitate assembly of the seven parts of the connective joints, at least one of the hinge elements is split into at least two parts. Preferably, one hinge element is split into two substantially identical halves and is provided with a screw or the like for connecting the two halves together after the joint is assembled.

Preferably, the two hinge elements each have a ring shaped portion that is inserted in one of two perpendicular grooves in the spherical element. The hinge elements also preferably include a stem or attachment portion which is adapted to be attached to an article such as a tripod or camera when the joint is in use.

According to a particular feature of the present invention, the ring portions of the hinge elements are made hollow, at least in part, to accommodate a flexible elongate element such as an electric wire or hollow tube. For example, the ring shaped portions of the hinge elements may have a U-shaped profile. Similarly, the quarter spheres are configured such that the spherical element is hollow, at least in part, to permit the flexible elongate element to extend from one of the hinge elements to the other. In this way, the elongate element may be passed entirely through the joint from one side to the other, eliminating the need for slip rings or the like for the transmission of an electric current.

The device for applying a force to the two opposing quarter spheres in the spherical element is preferably a simple bolt. In one embodiment, the bolt has an elongate shank with a flange at one end and a nut in threaded engagement with the shank at the other end. The shank extends through openings in the opposing quarter spheres with the flange abutting one quarter sphere and the nut abutting the other.

In another embodiment, the bolt has an elongate shank with a thread at one end and a flange at the opposite end. In this case, the shank extends through an opening in one quarter sphere and is in threaded engagement with an opening in the opposite quarter sphere. The flange on the shank abuts the opposite quarter sphere.

Preferably, the bolt also includes a knob at the end of the shank which bears the flange, to facilitate manual rotation of the shank.

According to another advantageous feature of the present invention, the force applying device includes a mechanism for applying a substantially constant compressive force to the diametrically opposing quarter spheres. In the case where a bolt is used as the force applying means, the means for applying a constant force preferably includes a spring arranged on the bolt shank between one of the quarter spheres and either the flange or the nut. This spring is preferably a coil spring arranged in compression. To adjust the tension of the coil spring an adjustment nut may be provided in threaded engagement with the shank.

Finally, according to a further feature of the present invention, a swivel base is fixedly attached to one of the hinge elements of the joint. Such a swivel base permits the joint to be rotated 360 degrees thereby providing three degrees of freedom of movement between the two articles attached to the joint.

Preferably, the swivel base includes a top portion, attached to one of the hinge elements and a bottom portion arranged for rotation with respect to the top portion. A device is also preferably provided for locking the bottom portion against rotation with respect to the top portion. The locking device may, for example, include a split ring and a bolt for clamping the ring together, thereby holding the top portion and bottom portion together.

The preferred embodiments of the present invention will now be described with reference to the accompanying drawings.

DESCRIPTION OF THE PREFERRED EMBODIMENTS

The preferred embodiments will now be described with reference to FIGS. 1-22 of the drawings. Identical elements in these various figures are identified with the same reference numerals. FIGS. 1-6 correspond to FIGS. 14-19, r respectively, of my copending patent application Ser. No. 07/492,622. FIGS. 7-10 correspond to FIGS. 31-34, respectively, of that application.

Figure 1:
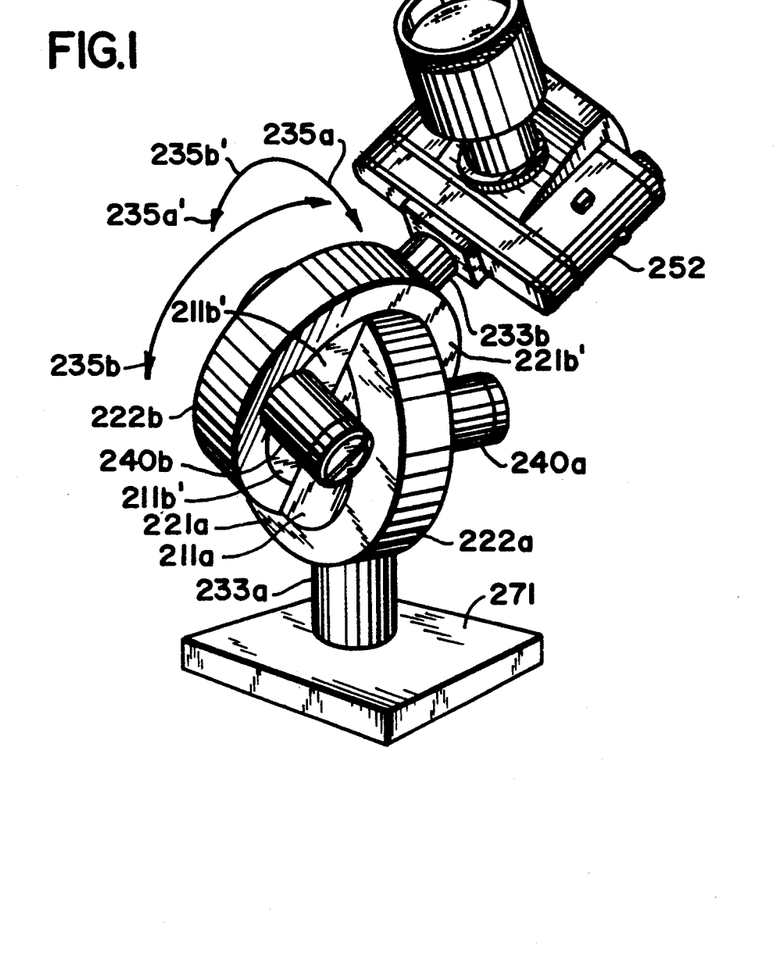
FIG. 1 is a perspective view of a joint assembly as disclosed in FIG. 14 of the aforementioned copending patent application Ser. No. 07/492,622.

FIG. 1 illustrates the joint shown as FIG. 14 of the aforementioned U.S. patent application Ser. No. 07/492,622. In this embodiment, one stem 233a of the joint is mounted to a generally stationary base 271. That stem 233a and its associated ring 221a-222a are accordingly generally stationary, although, if desired, an additional degree of freedom can be obtained by rotation of the stem 233a, about its own axis, relative to the base 271 or relative to the ring 221a-222a.

In this case, the relative motion of that stem 233a and ring 221a-222a with respect to the inner guide structure 221a-221b' etc. takes the form of rotation of the guide structure within the stationary ring. The relative motion of the second ring 221b-222b is then the more intuitively direct rotation of that second ring about the guide structure.

A representative article—that is, a camera 252—is shown as mounted to the second stem 233b, for rotation with the second ring 221b-222b. This is a type of item which may be usefully positioned automatically, or by manual operation of a gear-to-gear mechanism for fine adjustment, or even by completely manual operation.

The elements 240a-240b can be rotatably fixed to screw shafts that are threaded into the inner guide structure. They can thereby serve as screw clamps, to hold the respective rings 221a-221b in place on the inner structure.

Appearing in FIG. 1 is a substructure: the internal-corner shape formed by the two circular-segmental disc portions 211a and 221b' in the upper-right quadrant of the illustration. These two segments 221a-221b' intersect at an internal-corner line 221ab; these corner shapes themselves, rather than the individual discs, can be treated as the fundamental units of the inner guide structure. Each of the corner shapes can be isolated as a one-piece element 310ab, as shown in FIG. 2.

Figure 2:
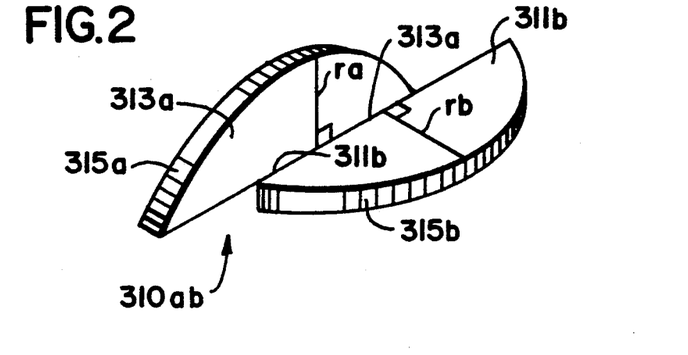
FIG. 2 is a perspective view showing an inner, corner guide for use in the embodiment of FIG. 1.

In FIG. 2, the two adjacent segments are 313a (with circular-segmental guide edge 315a) and 311b (with a like track 315b). These intersect along the internal-corner line 311b/313a.

Also appearing in FIG. 2 are two purely geometric reference lines: radii $r_a$ and $r_b$ of the two circles of which the guide edges 315a, 315b are respective segments. These radii are both constructed perpendicular to the corner line 311b/313a; therefore, their respective intersections with that corner line represent the closest points along that line to the centers of the two circles, respectively.

FIG. 2 thus demonstrates that the centers of the two circles are mutually offset along the intersection line 311b/313a. To couch this in more mechanical terms, since only the segments rather than the full circles are present, the centers of the two segments are mutually offset.

Figure 12:
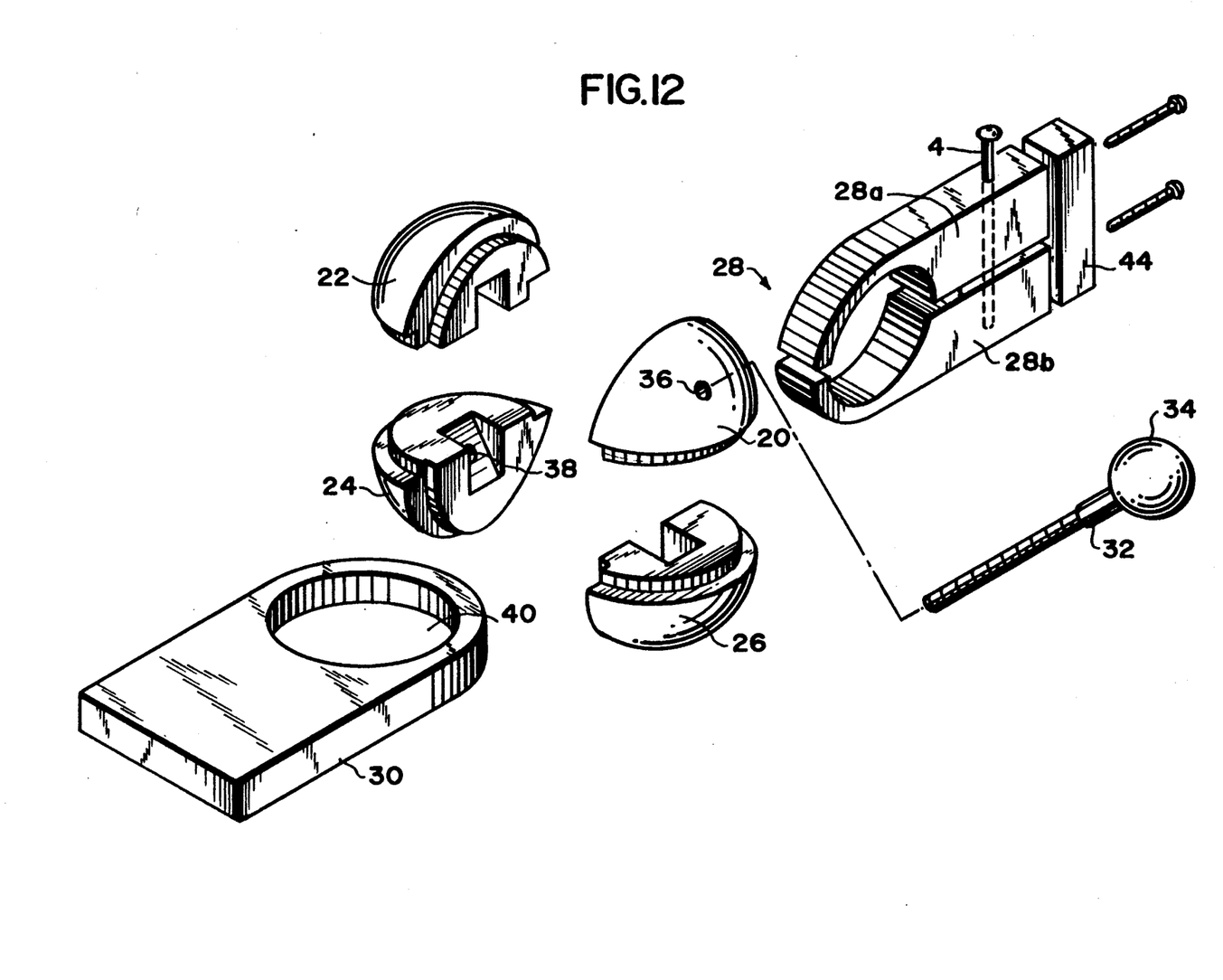
FIG. 12 is an exploded, assembly view of one preferred embodiment of the joint of FIG. 11.

The article shown in FIG. 2 is somewhat abstract in that the two segments are joined only along a geometric line. The two segments accordingly can be extended, along their common corner line, to form a solid connection region as is illustrated in FIG. 12 and will be described hereinafter.

Figure 3:
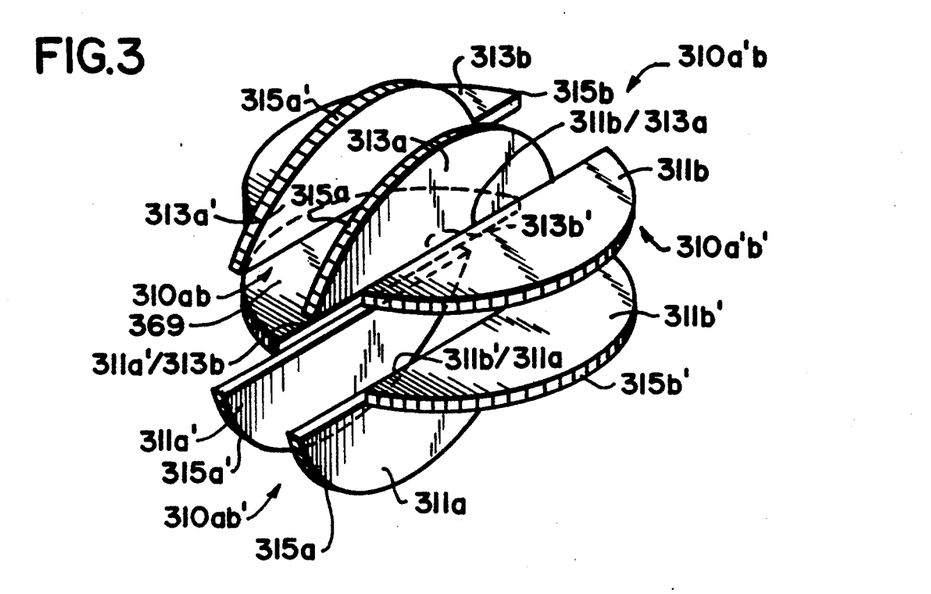
FIG. 3 is a perspective view of four corner guides, two of which are identical to that of FIG. 2, arrayed in correct relative position.

FIG. 3 shows a full array of four corners 310*ab*, 310*ab'*, 310*a'b* and 310*a'b'* used in an operating joint. By careful consideration of FIG. 3 it may be seen that the diagonally opposite corners 310*ab* an 310*a'b'* are identical to each other, and accordingly this pair of corners is interchangeable. Similarly, the remaining two diagonally opposite corners 310*a'b'* and 310*ab'* are identical to each other—constituting another pair of interchangeable corners.

The structure does, however, have an asymmetry or "handedness". The two pairs are different from one another, and not interchangeable. This is important as a practical matter as it means that two different types of corners, not just one type, must be manufactured.

The geometry of the FIG. 3 corner array can be maintained by the rings that rotate upon it, while conversely the rings are kept in position by the corner array. In other words, the structural elements can be made mutually interdependent, as shown in FIG. 4.

For this purpose the edges 315*a*, 315*a'*, 315*b*, 315*b'* of the corner segments are formed with dovetail cross-sections, as illustrated, to engage complementary shapes along the inner edges of the rings 320*a*, 320*b*. As FIG. 4 makes clear, the interior cavity 369 of the corner-guide structure is open and unobstructed.

Figure 4:
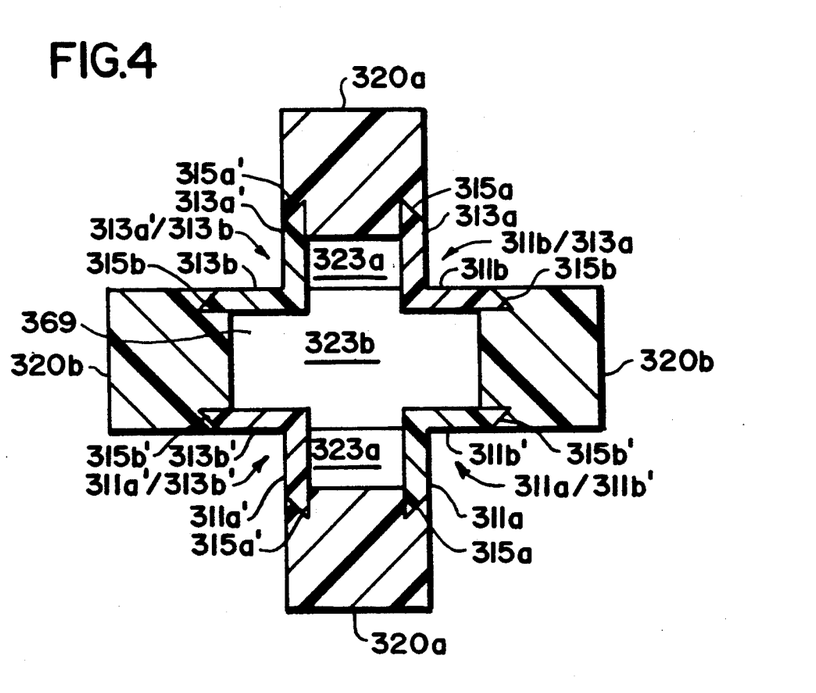
FIG. 4 is a cross-sectional elevation of the FIG. 1 array, taken "end-on", assembled with two outer rings.

In the system of FIG. 4, it is particularly easy to lock the rings 320*a*, 320*b* in place on the guide structure. This can be accomplished simply by passing a bolt or the like (not shown) diagonally through holes (not shown) in any two opposite corners—e.g., between the corner 311*a'*/313*b'* and the corner 311*b*/313*a*—and tightening the bolt to jam the entire assembly.

Figures 5, 6:
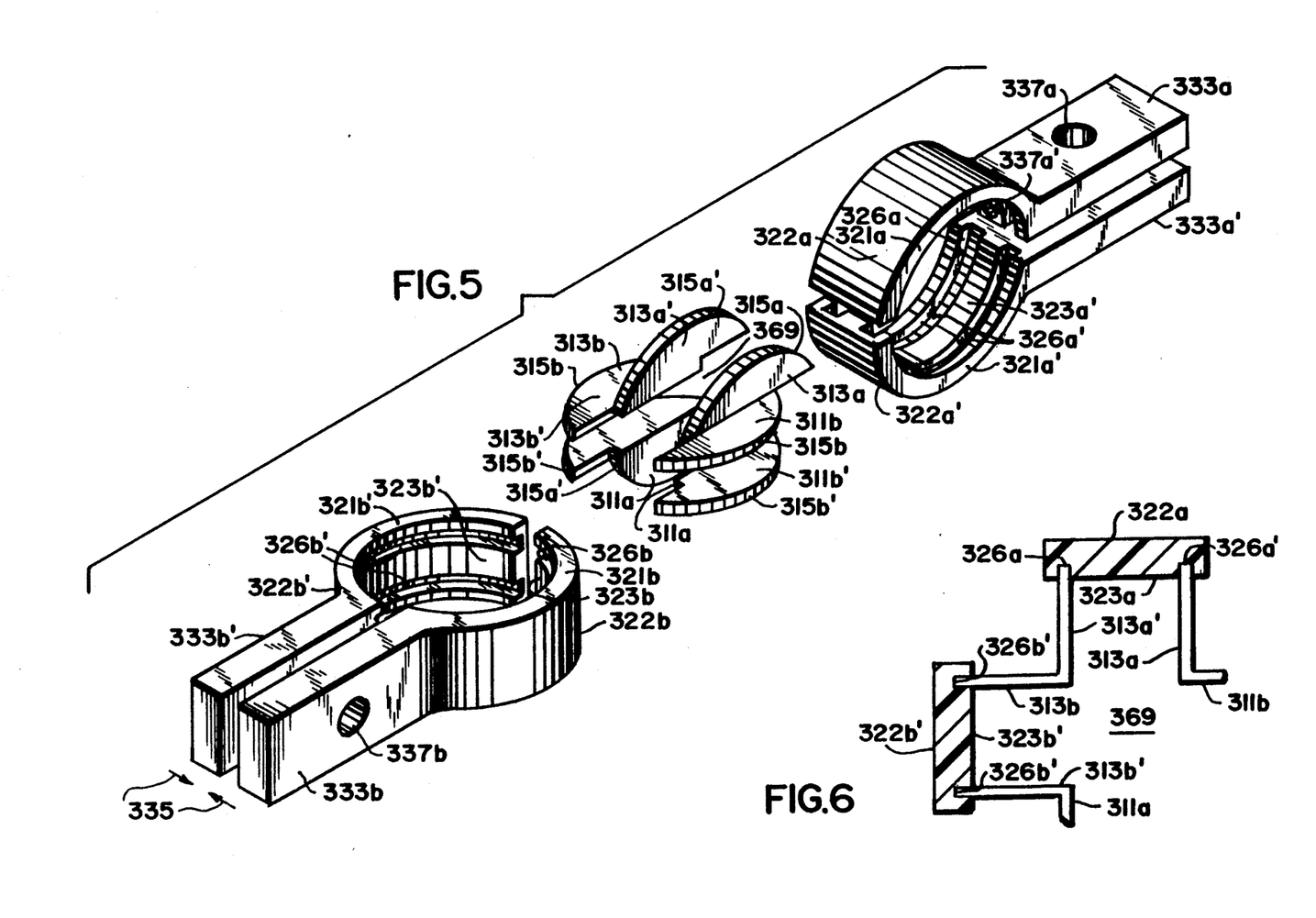
FIG. 5 is a perspective view showing the FIG. 1 corner-guide array in conjunction with two outer rings for assembly with the corner guides.
FIG. 6 is a cross-section of the FIG. 5 parts assembled.

FIGS. 5 and 6 show a similar structure, using square-cross-section guide edges, that is assembled from split rings 321*a*, 321*a'*, 322*b*, 322*b'* which have integrally formed split stems 333*a*, 333*a'*, 333*b*, 333*b'*. Only one ring actually need be split, to allow interlocking; but splitting both reduces tooling cost. Flux-transmission means can be threaded through holes 337*a*, 337*b*–337*b'* in the half stems 333*a*, 333*b*.

Figures 7, 8, 9:
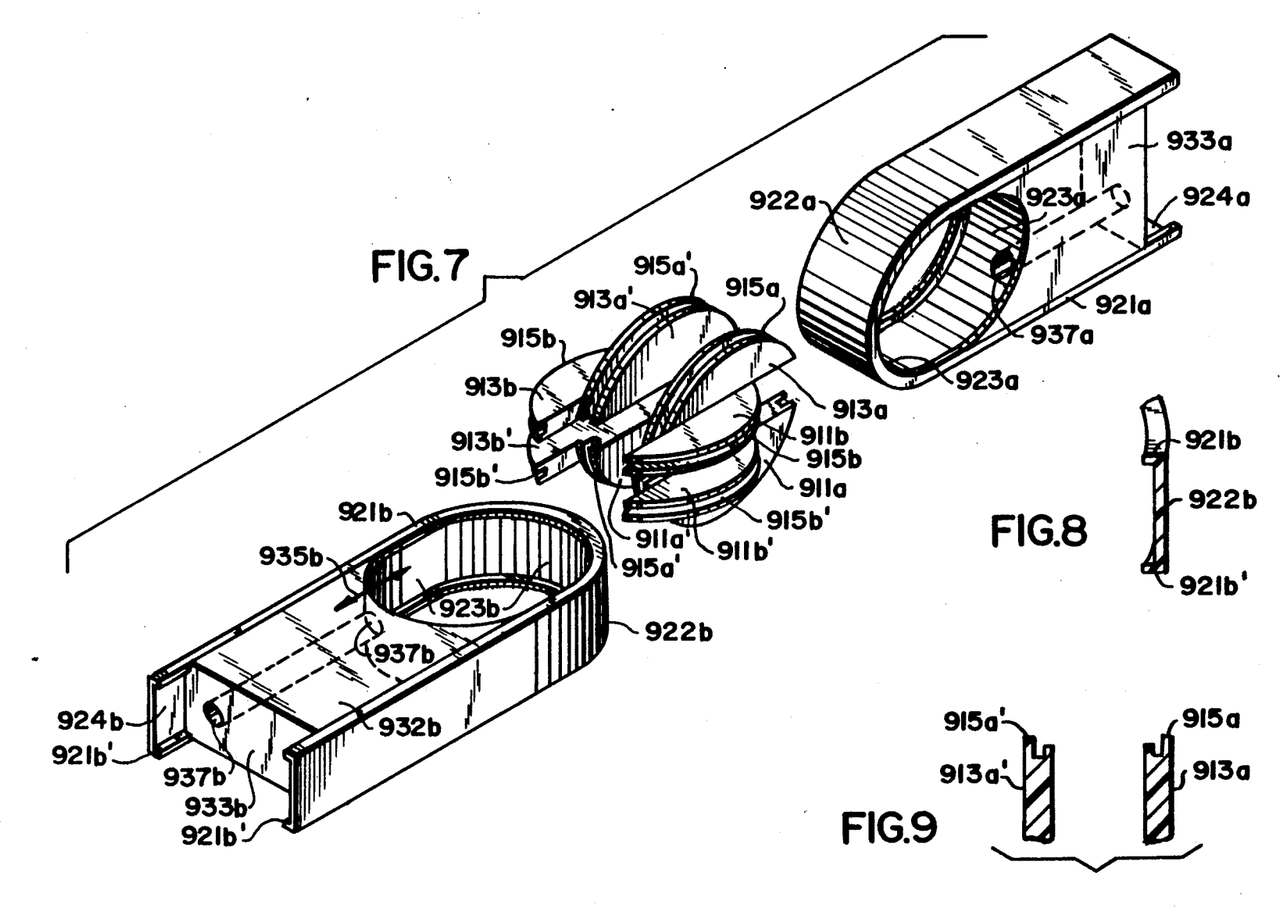
FIG. 7 is a perspective view of an embodiment that is closely related to that of FIG. 5, but employing variant constructions for the outer bodies and stems.
FIG. 8 is a cross-sectional elevation of a portion of the outer body of FIG. 7.
FIG. 9 is a like view of a portion of the constraining structure of FIG. 7.

FIGS. 7 through 10 illustrate an extremely inexpensive assembly, related to that of FIG. 5, in which each ring is formed as a shallow "C" channel 922*a*, 922*b* (see cross-section in FIG. 8), bent into a horseshoe shape as shown in FIG. 7, and fitted with an insert 933*a*, 933*b* that has a near-half-circle inner end 923*a'*, 923*b'* and a rectangular outer end.

Figure 10:
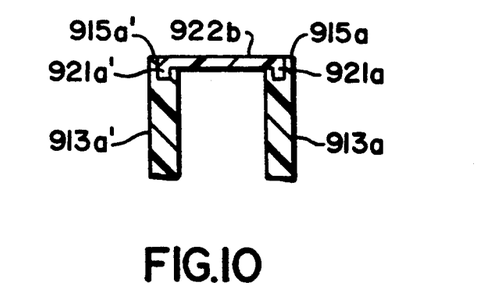
FIG. 10 is a like view showing interengagement of the parts shown in FIGS. 8 and 9, respectively.

The corner guides have slotted edges 915*a*, 915*a'* as shown in FIG. 9. The inward-protruding flanges 921*b*, 921*b'* (FIG. 8) that give the channel its "C" cross-section fit into these slots, as shown in FIG. 10, to serve as followers.

The rectangular outer ends of the two ring assemblies 921*a*–933*a*, 921*b*–933*b* serve as the stems. As will be appreciated, these stems are quite wide along their direction of rotation, and accordingly limit the angular range of rotation more than the stems in earlier discussed embodiments.

Flux-transmission means, such as an electric wire or hollow tubing, can be passed through the straight access holes 937*a*, 937*b*. These holes enter the central cavity off-center to help clear the opposing rings in the straight or extended configuration of the joint; and the rings are further apart, center-to-center, than in the embodiment of FIG. 1, so that the transmission means can bypass the opposing rings without the need for routing around to the point diametrically opposite the stem. In the assembled system, however, the transmission means will be visible where they pass between the inner end of each access hole and the interior cavity of the joint.

If desired, the "C" channels and inserts can be extended to serve as long arms, the arms and the rings thus being in effect unitary. This system can be applied in cascade but using between each two adjacent stages a single "C" channel that wraps around corner guides of both stages and has its two cut-off ends abutting each other partway between.

The above-mentioned compromises in angular operating range and in visibility of the transmission means inside the joint are tradeoffs in the interest of an extremely economical assembly that is particularly suited to implementation in lightweight construction for office or consumer applications such as a desk-mounted arm lamp.

Figure 11:
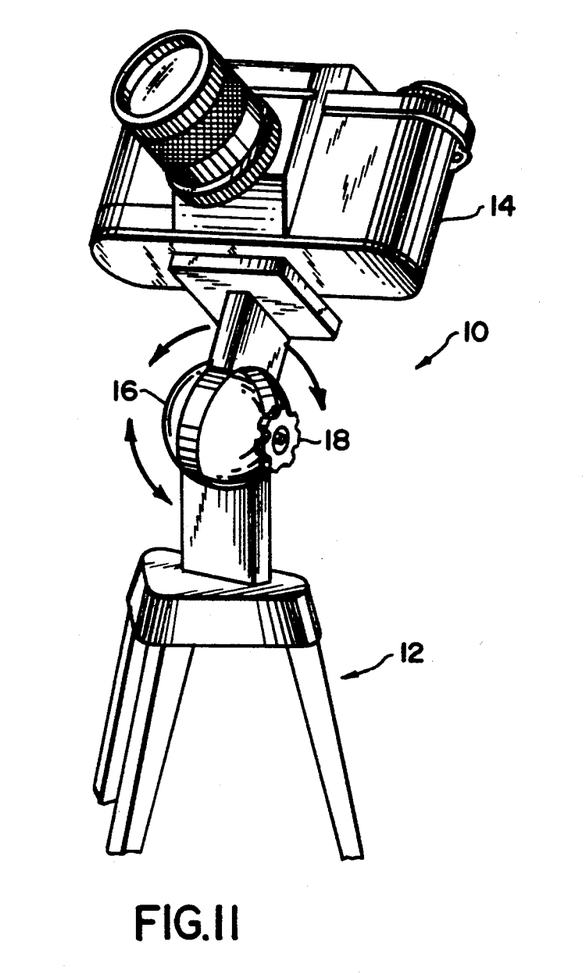
FIG. 11 is a perspective view of a modified connective joint in accordance with the principles of the present invention.

FIG. 11 illustrates a connective joint 10 according to the principles of the present invention arranged on a tripod 12 to support a camera 14. As may be seen, when comparing the illustration of FIG. 11 with that of FIG. 1, the central portion 16 of the connecting joint is spherically shaped. In addition, a single knob 18 serves to lock the joint in any given position.

FIG. 12 illustrates one preferred embodiment of the joint illustrated in FIG. 11, in exploded or assembly view. This joint comprises only seven parts, namely, four quarter spheres 20, 22, 24 and 26, two hinge elements or plates 28 and 30 containing rings for mounting the spheres, and a locking bolt 32 having an integral knob or handle 34. As may be seen, the quarter spheres 20–24 take the place of, and are equivalent to the four "corner guides" 310*ab* illustrated in FIGS. 2 and 3 of the joint illustrated in FIG. 1. These spheres are actually "filled in" versions of the corner guides; that is to say, they are corner guides with rounded external surfaces. The two hinge plates 28 and 30 are equivalent to the ring members 221 and 222 in the embodiment of FIG. 1. The bolt 32 extends through a nonthreaded opening 36 in the quarter sphere 20 and engages a threaded opening 38 in the quarter sphere 24.

During assembly, one edge groove in each of the quarter spheres is inserted into the opening 40 in the hinge plate 30. The hinge plate 28, which is formed of two half members 28*a* and 28*b*, is next assembled in place in the other edge grooves of the quarter spheres 20–26. Thereafter, the bolt 32 is inserted through the opening 36 and threaded into the opening 38 to hold the quarter spheres 20 and 24 together.

Finally, the two parts 28*a* and 28*b* of the hinge plate 28 are held together either by a screw 42 which passes through both members, or a cross member 44 attached to one end.

Once together, the assembled joint may be locked in any desired position by tightening the bolt 32.

Figure 13:
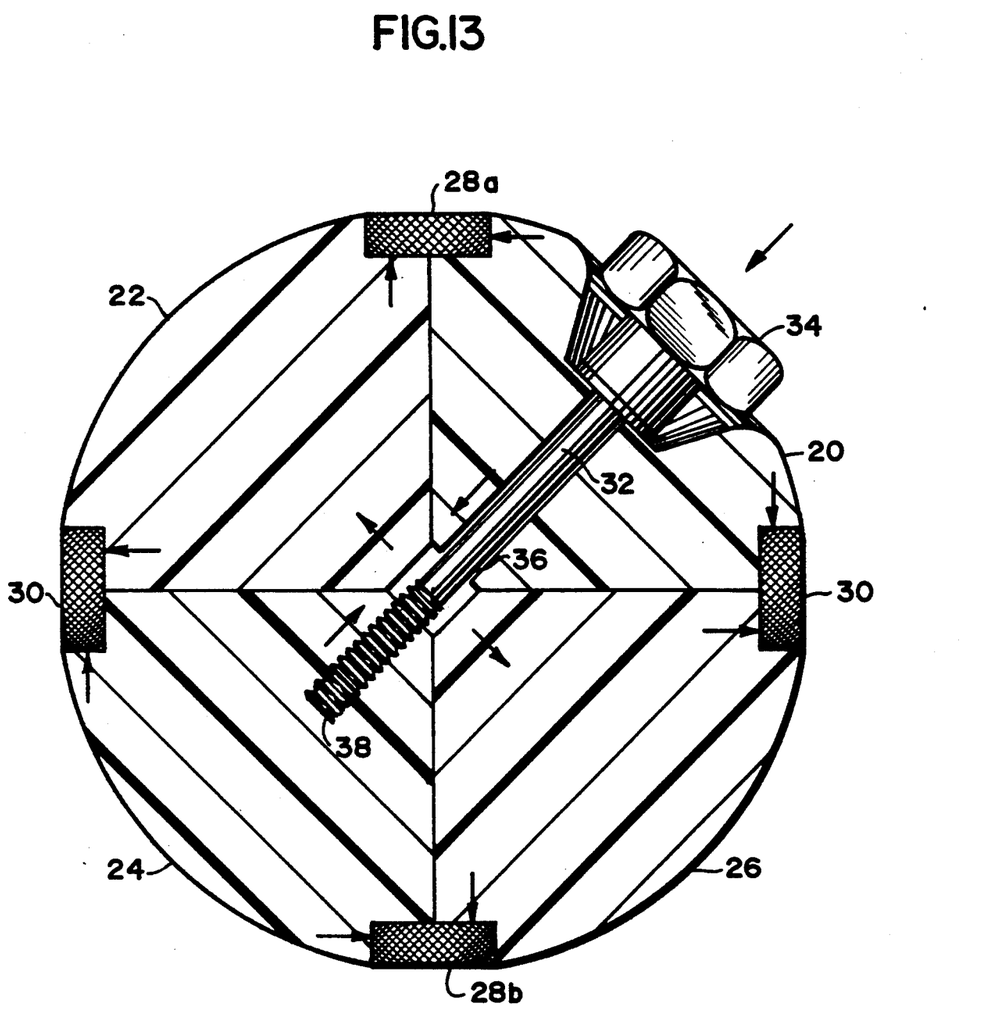
FIG. 13 is a cross-sectional view through the center of the joint of FIG. 12.

FIG. 13 illustrates the forces which are applied by tightening the bolt 32. As may be seen by the arrows, the quarter spheres 20 and 24 are drawn together and urged laterally against the sides of the hinge plates 28 and 30. Since the quarter spheres are in contact with each other, squeezing the quarter spheres 20 and 24 together causes the quarter spheres 22 and 26 to be pressed outwardly against the hinge plates 28 and 30. Since the hinge plates 28 and 30 can neither move outwardly nor laterally.

Figure 14:
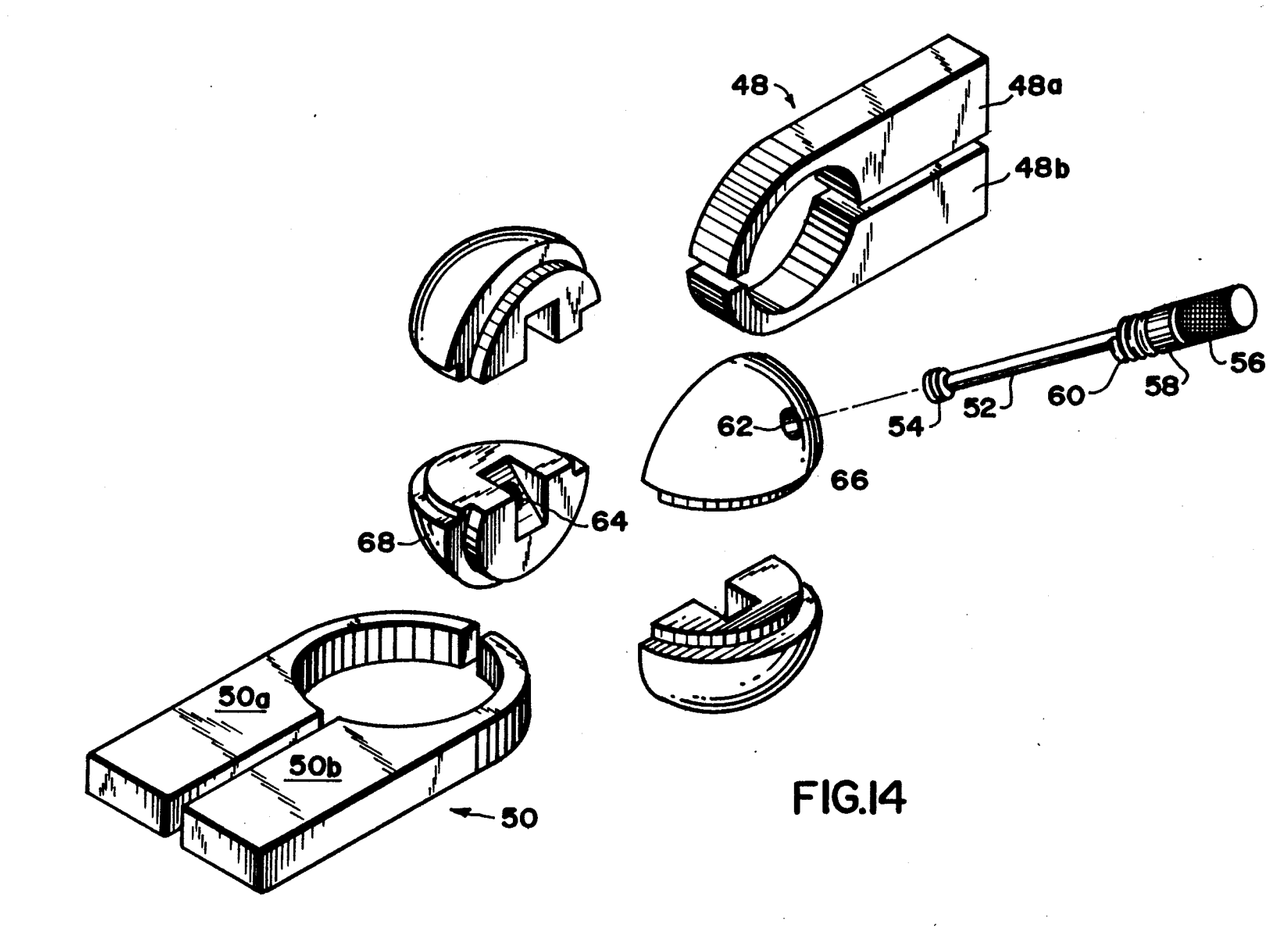
FIG. 14 is an exploded, assembly view of another preferred embodiment of the joint of FIG. 11.

FIG. 14 illustrates a second embodiment of the connective joint shown in FIG. 11. In this embodiment, both hinge plates, which serve as "rings", are split longitudinally into two halves. Thus, the hinge plate 48 is formed of two halves 48a and 48b and the hinge plate 50 is formed of two halves 50a and 50b. As illustrated in FIG. 12, one of the hinge plates can be formed as an integral member; however, at least one hinge plate must be formed in two halves to permit assembly of the joint.

The embodiment of FIG. 14 also comprises a bolt 52 having a flange 54 at one end. The opposite, upper end of the bolt is provided with a thumb knob 56, an adjustment nut 58 and a coil spring 60. The bolt 52 passes through nonthreaded openings 52 and 54 in quarter spheres 66 and 68, respectively.

Figure 15:
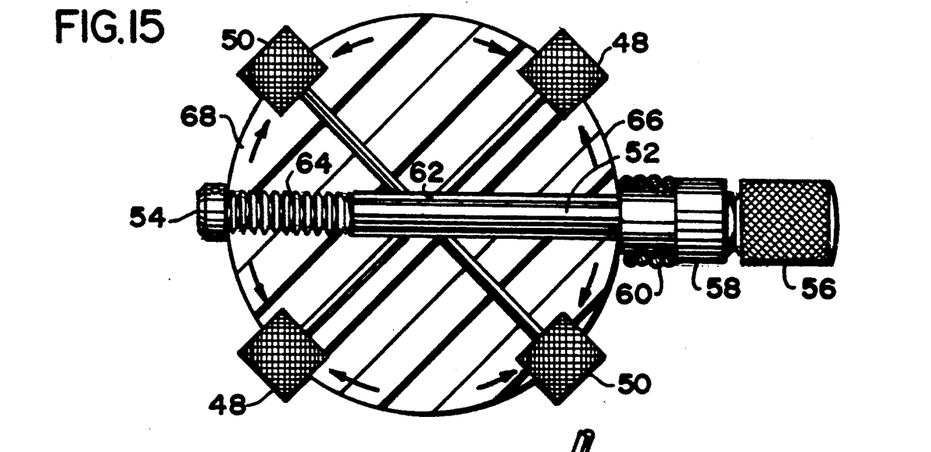
FIG. 15 is a cross-sectional view through the center of the joint of FIG. 14.

FIG. 15 shows the locking arrangement in the embodiment of FIG. 14. As is there shown, the bolt 52 is passed completely through the quarter spheres 66 and 68. The knurled thumb knob 56 is provided with a shoulder 57 that abuts against the quarter sphere 66. As may be seen in FIG. 15, a gap is provided between each pair of adjacent quarter spheres. As a consequence, the quarter spheres are not squeezed outwardly when the diametrically opposing spheres 66 and 68 are pressed together. Rather, the forces applied to the ring portions of the hinge plates 48 and 50 are only lateral, as shown by the arrows. The adjustment nut 58 and coil spring 60 form a spring loaded friction mechanism that enables the joint to retain a constant set pressure on the moving parts. This arrangement is useful in allowing the joint to be used with varying loads while retaining a relatively smooth motion.

Figure 16:
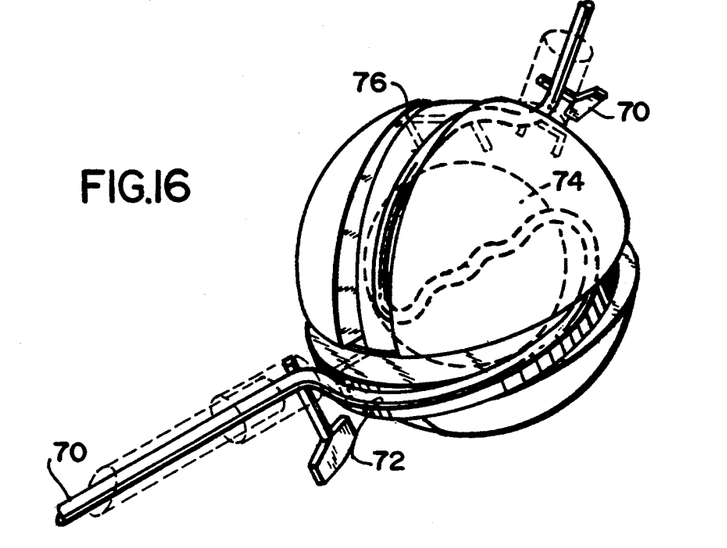
FIG. 16 is a perspective view, partially in phantom, showing the position of a wire extending through the joint of FIG. 11.
Figure 17:
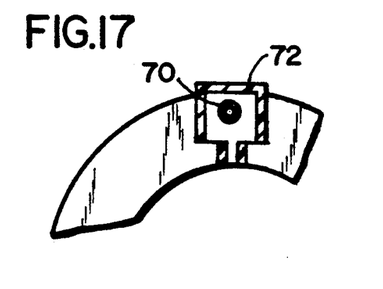
FIG. 17 is a cross-sectional view through a ring section of the joint assembly of FIG. 16 showing the position of the wire around the joint's periphery.
Figure 18:
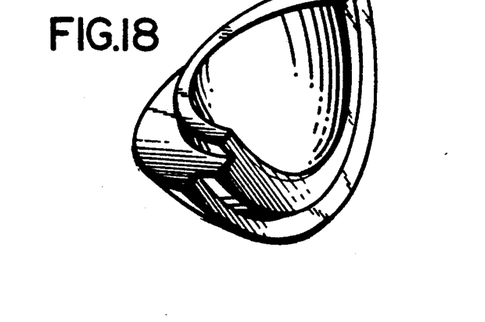
FIG. 18 is a perspective view showing a hollowed-out quarter sphere which is employed in the embodiment of FIG. 16.

FIGS. 16-18 illustrate how the joint may be modified to permit the passage therethrough of a flexible electric wire or hollow tubing 70. Such a wire or tubing is useful, for example, if the device (camera, surveying instrument, lamp, etc.) supported by the joint requires either electric power or fluid. As shown in FIG. 17, the ring portions of the hinge elements are constructed with a U-shaped cross-section, similar to FIGS. 7 and 8, to permit the passage of wire therethrough. As shown in FIG. 18, the quarter spheres are shaped in such a way as to make room for the wire through a hollow spherical center.

This U-shaped cross-section or profile of the hinge elements and the hollow spherical center of the joint are illustrated in phantom view in FIG. 16. As shown there, the wire 70 enters the ring portion of one hinge element 72, passes around the joint approximately 180 degrees and then enters its hollow spherical center 74. The wire crosses to the opposite side of the joint and then passes through the U-shaped profile of the other hinge element 76 The wire follows the ring portion of this hinge element 76 approximately 180 degrees and then exits from the joint.

Figure 19:
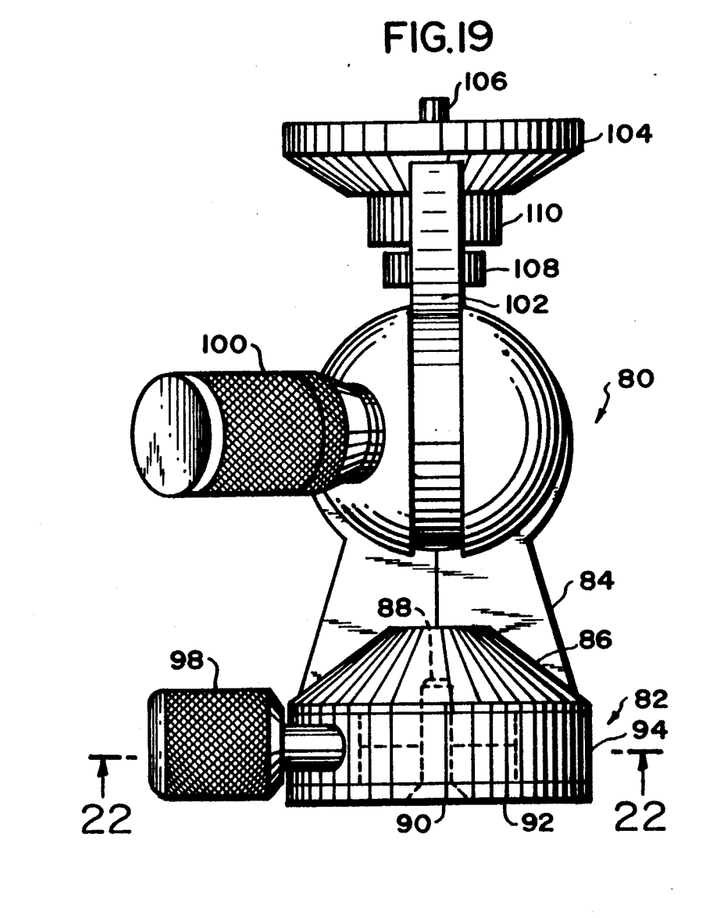
FIG. 19 is an elevational view showing one side of a connective joint of the type illustrated in FIG. 11, mounted on a swivel base.
Figure 20:
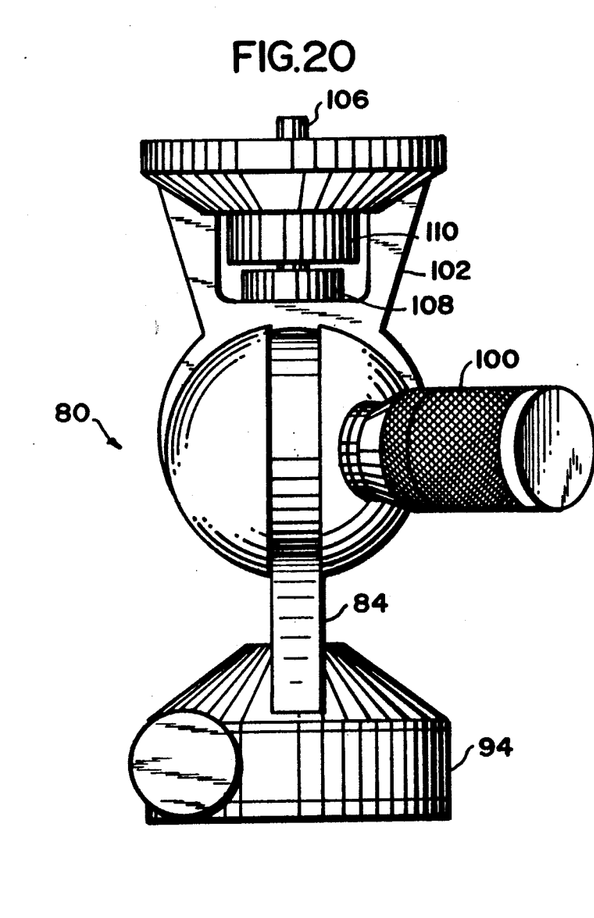
FIG. 20 is an elevational view showing another side of the joint and swivel base of FIG. 19, this side being turned 90 degrees with respect to the side shown in FIG. 19.

FIGS. 19 and 20 illustrate how the connective joint 80 may be mounted on a swivel base 82. In this case, one (laterally split) hinge plate 84 is affixed to a top portion 86 of the base 82. A bottom portion 92 of the base is rotatably attached to the top portion 86 by means of a suitable pivot 88 secured by a screw 90.

Figure 22:
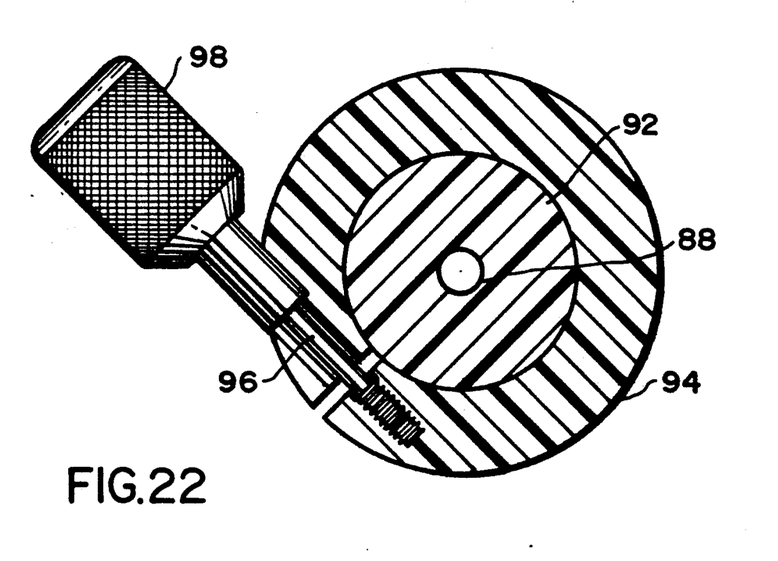
FIG. 22 is a cross-sectional view through the swivel base of the device of FIGS. 19-21, illustrating the locking mechanism.

A split ring 94 is provided around a rotatable bottom portion 92 of the base to permit the base to be locked against rotation. As is best illustrated in FIG. 22, the ring 94 is tightened around the bottom portion 92 by a bolt 96 with a knurled knob 98.

As illustrated in FIGS. 19 and 20, the upper hinge plate 102 of the joint is attached to a round camera support 104 having a bolt 106 with a knurled head 108 and a locking nut 110.

Figure 21:
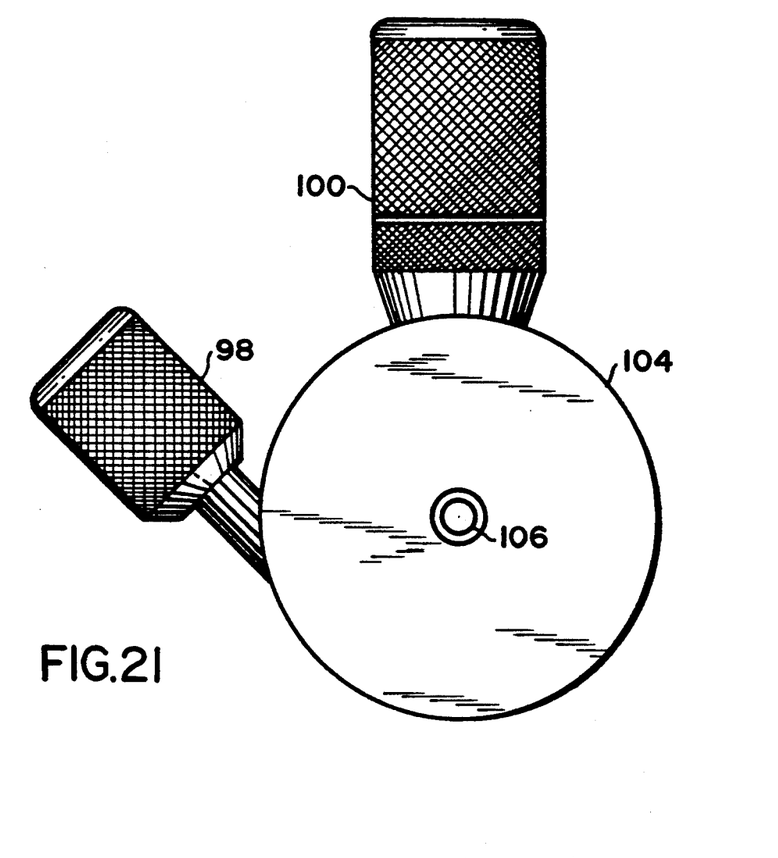
FIG. 21 is a top view of the joint and swivel base of FIGS. 19 and 20.

FIG. 21 shows the joint and base assembly of FIGS. 19 and 20 in top view. Protruding outward from the sides of the assembly are the knob 98 of the base locking mechanism and the knob 100 of the joint locking mechanism.

By combining the connective joint 80 with a swivel base 82, the camera or other article attached to the support 104 is permitted three degrees of freedom of movement.

There has thus been shown and described a novel interlocking-body connective joint which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a connective joint for interconnecting two articles for controlled relative motion, which joint comprises a pair of interlocking bodies; means for attaching each of the bodies to one of such articles, respectively; and structure constraining the bodies for systematic relative movement, said constraining structure including four quarter elements arranged in adjacent quadrant relationship; the improvement comprising means for inhibiting relative movement of said pair of interlocking bodies, wherein said movement inhibiting means includes means for applying a force between two diametrically opposing ones of said quarter elements.

2. The joint defined in claim 1, wherein said four quarter elements are quarter spheres which form a substantially spherical element when arranged in adjacent quadrant relationship.

3. The joint defined in claim 2, wherein said quarter spheres each have stepped edges forming two substantially perpendicular grooves, extending around said spherical element, when said four quarter spheres are arranged in adjacent quadrant relationship; and wherein said interlocking bodies include first and second hinge elements, each having a ring shaped portion inserted in one of said two grooves.

4. The joint defined in claim 3, wherein at least one of said first and second hinge elements is split into at least two parts to permit assembly around respective ones of said grooves.

5. The joint defined in claim 4, wherein said one hinge element is split into two substantially identical halves.

6. The joint defined in claim 4, further comprising means for connecting the separate parts of said at least one hinge together.

7. The joint defined in claim 3, wherein said first and second hinge elements each has an attachment portion adapted to be attached to a respective one of the two articles.

8. The joint defined in claim 3, wherein the ring portions of said first and second hinge elements are hollow, at least in part, to accommodate a flexible elongate element.

9. The joint defined in claim 8, wherein the ring portions of said first and second hinge elements have a U-shaped profile.

10. The joint defined in claim 8, wherein said quarter spheres are configured such that said spherical element is hollow, at least in part, to permit said flexible elongate element to extend from one of said hinge elements to the other.

11. The joint defined in claim 10, further comprising said elongate element, wherein said elongate element extends through a segment of the ring portion of said first hinge element, through the hollow portion of the spherical element, and thence through a segment of the ring portion of said second hinge element.

12. The joint defined in claim 11, wherein said segments are approximately 180 degrees.

13. The joint defined in claim 11, wherein said flexible elongate element is an electric wire.

14. The joint defined in claim 3, wherein said force applying means include a bolt.

15. The joint defined in claim 14, wherein said bolt has an elongate shank with a flange at one end and a nut in threaded engagement with the shank at the opposite end, and wherein said shank extends through openings in opposite ones of said quarter spheres with the flange abutting one quarter sphere and the nut abutting the other.

16. The joint defined in claim 14, wherein said bolt has an elongate shank with a thread at one end and a flange at the opposite end, said shank extending through an opening in one quarter sphere and into a threaded opening in, and being in threaded engagement with the opposite quarter sphere, said flange abutting said one quarter sphere to said opposite quarter sphere.

17. The joint defined in claim 16, wherein said bolt includes a knob at the end of the shank having the flange, said knob serving to facilitate manual rotation of the shank.

18. The joint defined in claim 14, wherein said force applying means further includes means for applying a substantially constant compressive force to said opposite ones of said quarter spheres.

19. The joint defined in claim 18, wherein said bolt has an elongate shank with a flange at one end and a nut in threaded engagement with the shank at the opposite end, and wherein said shank extends through openings in opposite ones of said quarter spheres with the flange abutting one quarter sphere and the nut abutting the other, and wherein said force applying means includes a spring arranged on said bolt between one of said quarter spheres and one of said flange and said nut.

20. The joint defined in claim 19, wherein said spring is a coil spring arranged in compression.

21. The joint defined in claim 19, further comprising an adjustment nut in threaded engagement with said shank and adjacent said spring, for adjusting the spring tension.

22. The joint defined in claim 18, wherein said bolt has an elongate shank with a thread at one end and a flange at the opposite end, said shank extending through an opening in one quarter sphere and into a threaded opening in, and being in threaded engagement with the opposite quarter sphere, said flange abutting said one quarter sphere to said opposite quarter sphere, and wherein said force applying means includes a spring arranged on said bolt between said one quarter sphere and said flange.

23. The joint defined in claim 22, wherein said spring is a coil spring.

24. The joint defined in claim 22, further comprising an adjustment nut in threaded engagement with said shank and adjacent said spring, for adjusting the spring tension.

25. The joint defined in claim 3, wherein said force applying means includes means for applying a substantially constant compressive force to said opposite ones of said quarter spheres.

26. The joint defined in claim 3, further comprising a swivel base connected to one of said hinge elements.

27. The joint defined in claim 26, wherein said swivel base includes a top portion, attached to said one of said hinge elements, and a bottom portion, arranged for rotation with respect to said top portion.

28. The joint defined in claim 27, further comprising means for locking said bottom portion against rotation with respect to said top portion.

29. The joint defined in claim 28, wherein said locking means includes a split ring and means for clamping said split ring on at least one of said top portion and said bottom portion.

* * * * *